(12) United States Patent
Sekimoto et al.

(10) Patent No.: US 8,052,340 B2
(45) Date of Patent: Nov. 8, 2011

(54) IMAGING APPARATUS

(75) Inventors: Tatsuo Sekimoto, Kanagawa (JP); Atsuya Ishii, Kanagawa (JP); Ryuhei Azuma, Kanagawa (JP); Kunioki Takahashi, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/653,431

(22) Filed: Dec. 14, 2009

(65) Prior Publication Data

US 2010/0158506 A1 Jun. 24, 2010

(30) Foreign Application Priority Data

Dec. 22, 2008 (JP) ................. P2008-326273

(51) Int. Cl.
*G03B 9/02* (2006.01)
(52) U.S. Cl. ...................................... 396/505
(58) Field of Classification Search .............. 396/505
See application file for complete search history.

(56) References Cited

U.S. PATENT DOCUMENTS 5,953,062 A * 9/1999 Sugimori et al. ............. 348/364
6,535,691 B1 * 3/2003 Kobayashi .................... 396/136

FOREIGN PATENT DOCUMENTS

| JP | 07159853 A | 6/1995 |
| JP | 2002072327 A | 3/2002 |
| JP | 2002156683 A | 5/2002 |
| JP | 2004-012938 A | 1/2004 |
| JP | 2005242114 A | 9/2005 |
| JP | 2007047289 A | 2/2007 |

OTHER PUBLICATIONS

Office Action from Japanese Application No. 2008-326273, dated Sep. 7, 2010.
Office Action from Japanese Application No. 2008-326273, dated Feb. 8, 2011.

* cited by examiner

*Primary Examiner* — Clayton E LaBalle
*Assistant Examiner* — Leon W Rhodes, Jr.
(74) *Attorney, Agent, or Firm* — Lerner, David, Littenberg, Krumholz & Mentlik, LLP

(57) ABSTRACT

A light quantity adjuster includes: a blade member forming an aperture; a stepping motor that moves the blade member to open/close the aperture; and a control section that controls driving of the stepping motor, and increases a rotational speed of the stepping motor after a resistance acting on the stepping motor changes from static friction to dynamical friction in case of closing the aperture.

5 Claims, 7 Drawing Sheets

FIG.3

| T1 90% CHANGE IN LIGHT QUANTITY α | T2 80% CHANGE IN LIGHT QUANTITY β | RATIO OF CHANGE-OVER TIME T TO NORMAL OPERATION TIME | CHANGE IN SHUTTER TIME (%) |
|---|---|---|---|
| RELATED-ART OPERATION WITHOUT CHANGEOVER | | 100.00 | 100 |
| 0.5 | 0.38 | 8.5 | NO SHUTTER ACTION |
| 0.6 | 0.40 | 10.2 | 90.8 |
| 1.0 | 0.77 | 17.0 | 81.0 |
| 1.5 | 1.15 | 25.6 | 79.7 |
| 2.0 | 1.54 | 34.1 | 84.8 |
| 2.5 | 1.92 | 42.6 | 91.1 |
| 3.0 | 2.31 | 51.1 | 97.4 |
| 3.5 | 2.69 | 59.6 | 101.3 |

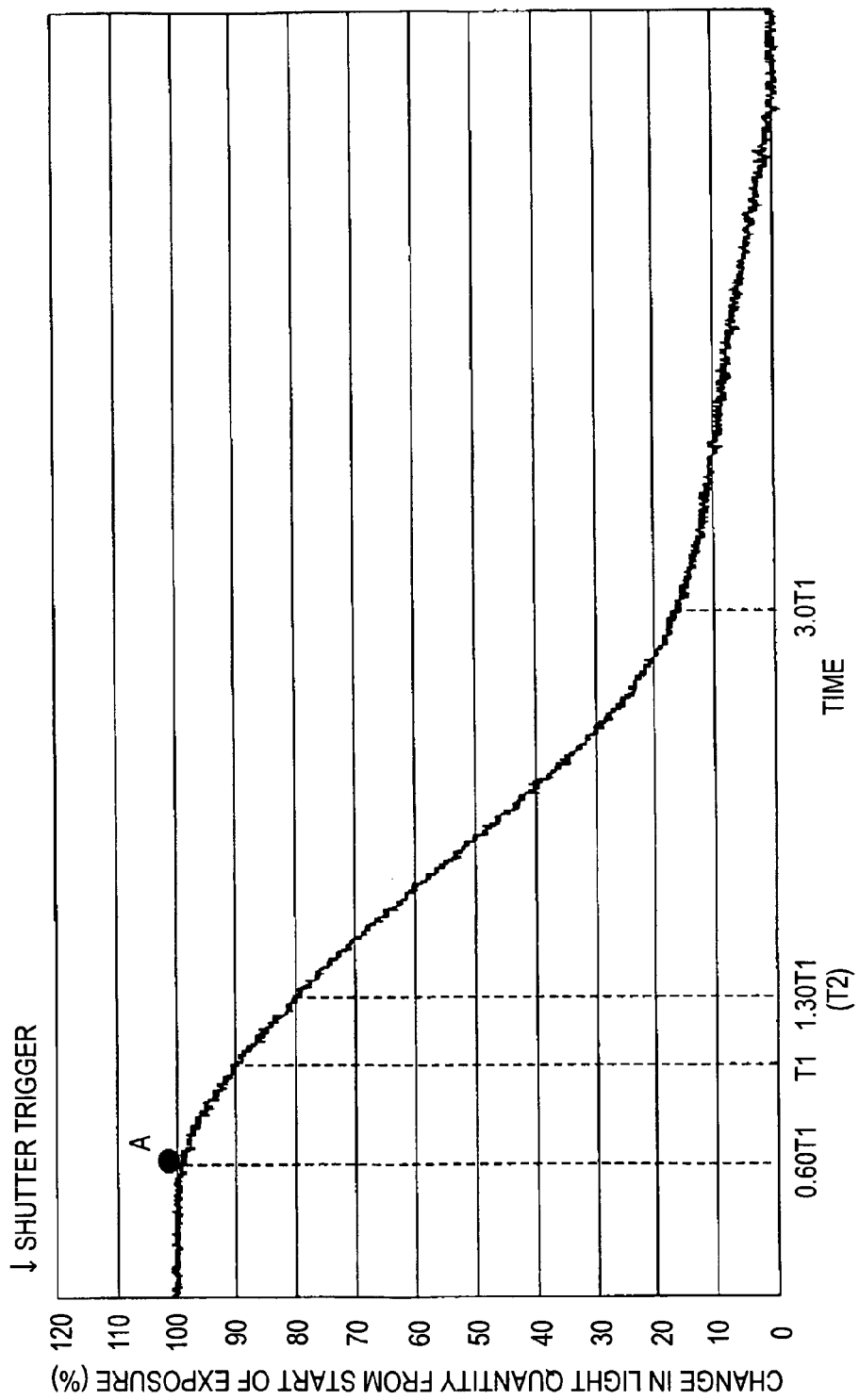

IMAGING APPARATUS

CROSS-REFERENCE TO RELATED APPLICATION

The present application claims priority from Japanese Patent Application No. JP 2008-326273 filed in the Japanese Patent Office on Dec. 22, 2008, the entire content of which is incorporated herein by reference.

BACKGROUND OF THE INVENTION

1. Field of the Invention

The present invention relates to a light quantity adjuster that adjusts the quantity of light input via a lens, and an imaging apparatus using the light quantity adjuster.

2. Description of the Related Art

An imaging apparatus, such as a video camera or still camera, is provided with a light quantity adjuster that adjusts the quantity of light input via a lens. In general, the light quantity adjuster has a blade member disposed on the optical axis of the lens, and a drive section that moves the blade member to change the size of the aperture.

A stepping motor, for example, is used as the drive section of the light quantity adjuster.

An imaging apparatus according to a related art drives the stepping motor of the light quantity adjuster always at a constant speed to change the state of the aperture from an open state to a closed state, thereby capturing a still image. When the amount of movement of the blade member from the open state of the aperture to the closed state thereof is large, a change in the quantity of light passing the aperture forms a wavy curve, resulting in a longer exposure time.

When the exposure time (shutter speed) becomes longer, the reproducibility of exposure drops, degrading the quality of the image. When the shutter speed becomes greater than the period of a vertical sync signal of the imaging apparatus, changeover of images occurs during exposure, so that exposure control of the imaging apparatus becomes complex.

A change in the quantity of light passing the aperture will be described referring to FIG. 7. FIG. 7 is a diagram showing the relation between the actual change in light quantity when the stepping motor is driven always at a constant speed, and a change in light quantity instructed by a microprocessor.

For example, a frictional resistance occurs between the drive shaft of the stepping motor and a member that transforms the rotation of the drive shaft to the movement of the blade member. Accordingly, the actual change in light quantity starts with a delay from the timing (triggering) at which an instruction indicating the start of the operation is transmitted to the stepping motor (state a). Then, the drive speed of the stepping motor becomes faster to catch up with the instructed change in light quantity, so that the actual change in light quantity is faster than the instructed change in light quantity (state b).

When the actual change in light quantity catches up with the instructed change in light quantity thereafter, the actual change in light quantity cannot become greater than the instructed change in light quantity, so that the drive speed of the stepping motor becomes slower to cause the actual change in light quantity to become substantially equal to the instructed change in light quantity while making a transient response (state c). Because the actual change in light quantity transiently responds to the instructed change in light quantity, the actual change in light quantity becomes a wavy curve, making the exposure time longer.

One way to avoid the prolongation of the exposure time is to make the electric period of the stepping motor shorter. A technique of shortening the electric period of a stepping motor is described in, for example, JP-A-2004-12938 (Patent Document 1). According to the technique described in Patent Document 1, the conduction phase that is ahead of the phase of conduction to the coil in the light quantity adjustment state, which is determined by the condition of conduction to two sets of electromagnets, in the closing direction by 90 degrees is set as an initial conduction phase.

SUMMARY OF THE INVENTION

If the electric period of the stepping motor is made shorter as done by the technique described in Patent Document 1, however, a change in light quantity with respect to the rotational angle of the stepping motor becomes larger. Therefore, the resolution of exposure of the light quantity adjuster using such a stepping motor is restricted by the halt accuracy of the stepping motor and the resolution of the circuitry.

The restriction of the resolution of exposure makes it difficult to execute exposure control matching with imaging of a moving picture, so that the adequate amount of exposure cannot be obtained. Therefore, adaptation of the light quantity adjuster whose stepping motor has a shortened electric period to an imaging apparatus brings about a problem of causing over-exposure or under-exposure of the imaged moving picture.

Under the circumstances, it is desirable to ensure exposure control matching with imaging of a moving picture and carry out the shutter operation suitable for imaging of a still picture.

According to an embodiment of the present invention, there is provided a light quantity adjuster including a blade member, a stepping motor, and a control section. The blade member forms an aperture, and the stepping motor moves the blade member to open/close the aperture. The control section controls driving of the stepping motor, and increases a rotational speed of the stepping motor after a resistance acting on the stepping motor changes from static friction to dynamical friction in case of closing the aperture.

According to another embodiment of the present invention, there is provided an imaging apparatus including a lens barrel, and an apparatus body that supports the lens barrel. The lens barrel is provided with a lens and a light quantity adjuster which adjusts a quantity of light input via the lens. The light quantity adjuster includes a blade member, a stepping motor, and a control section. The blade member forms an aperture, and the stepping motor moves the blade member to open/close the aperture. The control section controls driving of the stepping motor, and increases a rotational speed of the stepping motor after a resistance acting on the stepping motor changes from static friction to dynamical friction in case of closing the aperture.

In case of closing the aperture, the light quantity adjuster and imaging apparatus according to the embodiments of the invention increases the rotational speed of the stepping motor after the resistance acting on the stepping motor changes from static friction to dynamical friction. This makes the time needed to close the aperture shorter than the time needed to close the aperture by rotating the stepping motor at a constant speed. In addition, it is unnecessary to make the electric period of the stepping motor shorter, thereby ensuring exposure control matching with the imaging of a moving picture.

The light quantity adjuster and imaging apparatus according to the embodiments of the invention can ensure exposure control matching with imaging of a moving picture and carry out the shutter operation suitable for imaging of a still picture.

BRIEF DESCRIPTION OF THE DRAWINGS

FIG. 3 is a table showing the results of measuring a shutter time when a change-over time of increasing the rotational speed of a stepping motor according to the embodiment of the light quantity adjuster is changed;

FIG. 4 is a diagram showing a change in light quantity when a shutter operation is executed by controlling the stepping motor according to the embodiment of the light quantity adjuster in such a way that the stepping motor is driven at a constant rotational speed;

DESCRIPTION OF THE PREFERRED EMBODIMENT

Figure 1:
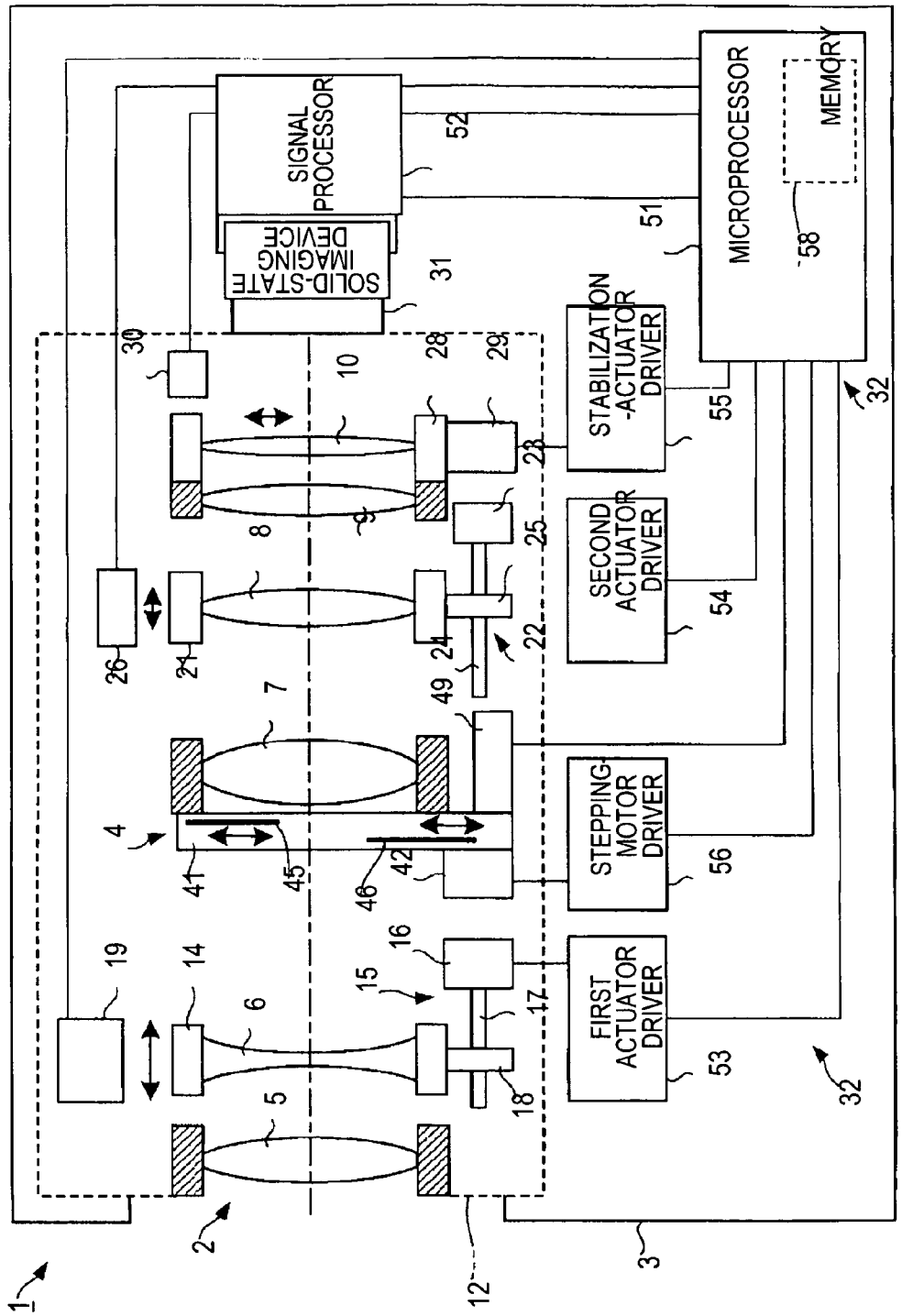
FIG. 1 is a block diagram showing an example of the configuration of one embodiment of an imaging apparatus according to the present invention.

Embodiments of an imaging apparatus according to the present invention will be described below with reference to the accompanying drawings. Same reference numerals are given to common components throughout the diagrams. The invention is not limited to an embodiment described below.
[Configuration of Imaging Apparatus]

To begin with, the configuration of an imaging apparatus representing one embodiment of the imaging apparatus according to the invention will be described referring to FIG. 1.

FIG. 1 is a block diagram showing an example of the configuration of one embodiment of the imaging apparatus according to the invention.

An imaging apparatus 1 is configured to be able to convert an optical image to an electric signal by means of a solid-state imaging device, such as a CCD image sensor or a CMOS image sensor, and record the electric signal into an information recording medium. In addition, the imaging apparatus 1 displays an image on a display section, such as a liquid crystal display or an organic EL display, based on the electric signal converted by the solid-state imaging device.

The imaging apparatus 1 includes a lens barrel 2 and an apparatus body 3 that supports the lens barrel 2. The lens barrel 2 has six lens groups 5 to 10 disposed on an optical axis L, a light quantity adjuster 4 which adjusts the quantity of light input via the lens groups 5 to 10, and a barrel case 12 which fixes or movably supports the lens groups 5 to 10.

The first lens group 5 is fixed to the barrel case 12 and faces a subject. The light which has passed the first lens group 5 enters the second lens group 6. The second lens group 6 is fixed to a first movable frame 14. The first movable frame 14 is configured to be movable backward and forward within a predetermined range in the direction of the optical axis L by a first actuator 15 provided at the barrel case 12.

The first actuator 15 has a motor 16, a screw shaft 17 provided as the shaft of the motor 16, and a feed nut 18 which is engaged with the screw shaft 17. The feed nut 18 is fixed to the first movable frame 14, so that the feed nut 18 cannot move in the extending direction of the screw shaft.

As the motor 16 is driven, the torque of the screw shaft 17 is transmitted to the feed nut 18. As a result, the feed nut 18 moves in the axial direction of the screw shaft 17 which rotates at a predetermined position, and the first movable frame 14 moves together with the feed nut 18 in the direction of the optical axis L. That is, the second lens group 6 is selectively moved in the direction of approaching the first lens group 5 or in the direction of approaching the third lens group 7 according to the rotational direction of the screw shaft 17. A sensor 19 which detects the position of the second lens group 6 is provided at the barrel case 12.

The third lens group 7 is fixed to the barrel case 12. An adjuster body 41 of the light quantity adjuster 4 is disposed between the third lens group 7 and the second lens group 6. The adjuster body 41 will be described later. The light which has passed the third lens group 7 enters the fourth lens group 8. The fourth lens group 8 is fixed to a second movable frame 21. The second movable frame 21 is configured to be movable backward and forward within a predetermined range in the direction of the optical axis L by a second actuator 22 provided at the barrel case 12.

The second actuator 22, like the first actuator 15, has a motor 23, a screw shaft 24 provided as the shaft of the motor 23, and a feed nut 25 which is engaged with the screw shaft 24. The operation of the second actuator 22 is the same as the operation of the first actuator 15. That is, the fourth lens group 8 is selectively moved in the direction of approaching the third lens group 7 or in the direction of approaching the fifth lens group 9 according to the rotational direction of the screw shaft 24. A sensor 26 which detects the position of the fourth lens group 8 is provided at the barrel case 12.

The fifth lens group 9 is fixed to the barrel case 12. The light which has passed the fifth lens group 9 enters the sixth lens group 10. The sixth lens group 10 is a stabilization lens for stabilizing shaking of an image caused by vibration or the like. The sixth lens group 10 constitutes a part of an image stabilizer 27.

When hand shaking or the like results in shaking of the apparatus body 3, the image stabilizer 27 moves the sixth lens group 10 according to the shaking to stabilize image shaking. The image stabilizer 27 includes a lens holding frame 28 which holds the sixth lens group 10, and a stabilization actuator 29 which moves the lens holding frame 28 on a plane orthogonal to the optical axis L.

The stabilization actuator 29 has, for example, a magnet fixed to the lens holding frame 28 and a coil fixed to a support member (not shown) which movably supports the lens holding frame 28. The image stabilizer 27 is provided with a sensor 30 which detects the position of the sixth lens group 10.

A solid-state imaging device 31 is disposed at the back of the sixth lens group 10. The solid-state imaging device 31 is fixed to a mount adapter (not shown), and is mounted to the barrel case 12 via the mount adapter. The solid-state imaging device 31 converts the image (light) of a subject, which is supplied thereto by an optical system including the six lens groups 5 to 10, to an electric image signal. The apparatus body 3 is provided with a control section 32, which will be described later.

[Configuration of Light Quantity Adjuster]

Next, the configuration of the light quantity adjuster 4 will be described referring to FIGS. 1 and 2.

Figure 2:
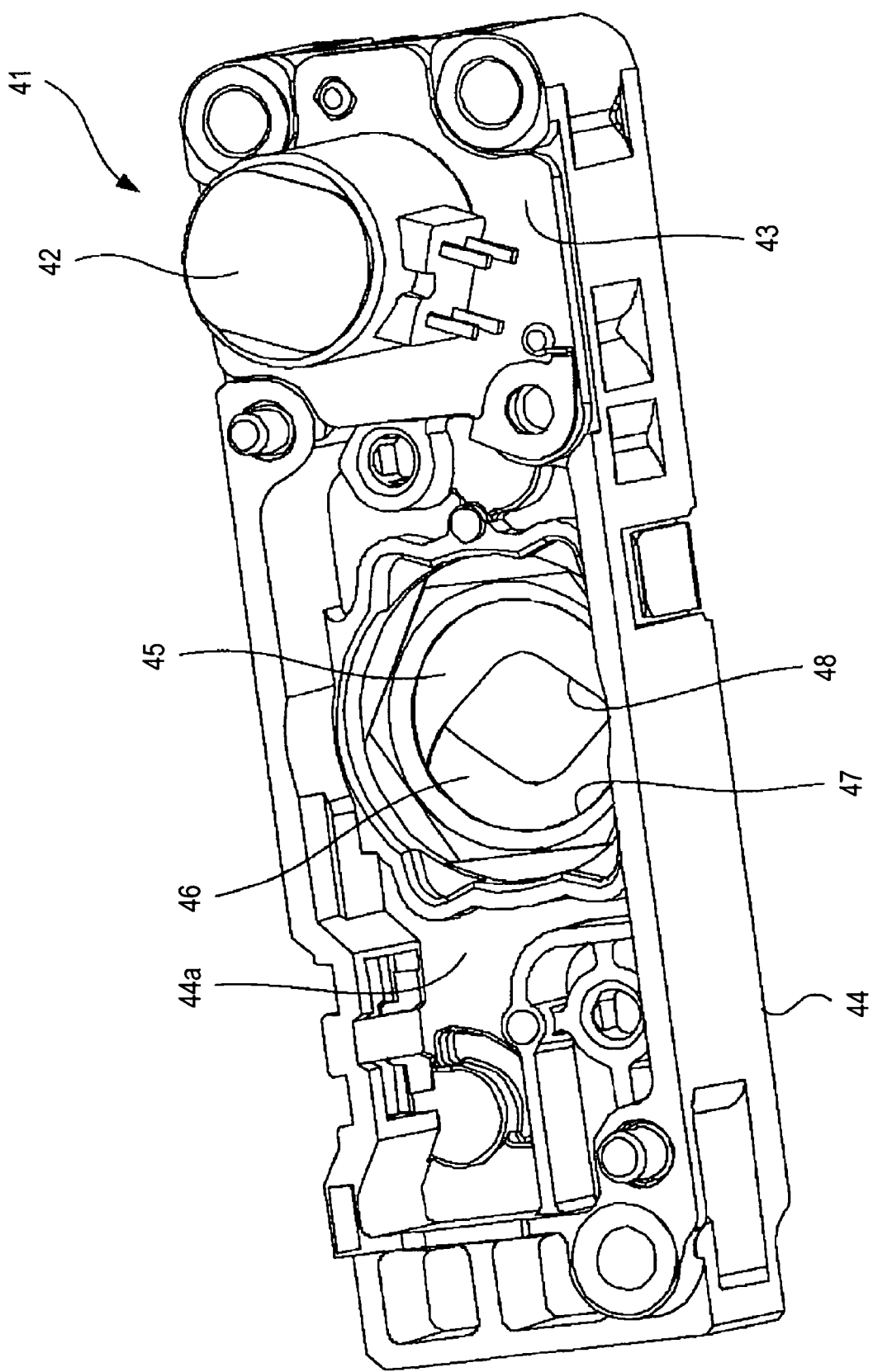
FIG. 2 is a perspective view showing an adjuster body according to one embodiment of a light quantity adjuster according to the invention.

FIG. 2 is a perspective view showing the adjuster body 41 of the light quantity adjuster 4.

As shown in FIG. 1, the light quantity adjuster 4 includes the adjuster body 41, a stepping motor 42, a microprocessor 51 which constitutes a part of the control section 32 provided at the imaging apparatus 1, and a stepping-motor driver 56. That is, the control section of the light quantity adjuster 4 includes the microprocessor 51 and the stepping-motor driver 56.

As shown in FIG. 2, the adjuster body 41 includes a base part 44, a pair of blade members 45, 46, and a moving mechanism (not shown) which guides movements of the pair of blade members 45, 46.

The base part 44 is an approximately rectangular plate member having an appropriate thickness, and is fixed to the barrel case 12 by a fixing screw (not shown). One face 44a of the base part 44 faces the second lens group 6, and the other face faces the third lens group 7. An optical path hole 47 is provided substantially in the center of the base part 44. The stepping motor 42 is fixed to the one face 44a of the base part 44 via a motor mount 43.

The pair of blade members 45, 46 are formed into an approximately rectangular sheet, and are disposed on the other face of the base part 44. According to the embodiment, the pair of blade members 45, 46 are formed by a mixture of polyethylene terephthalate and carbon for the antistatic purpose. The blade members 45, 46 form an aperture 48 at a position facing the optical path hole 47. The size of the aperture 48 changes according to the movements of the pair of blade members 45, 46. A sensor 49 which detects the diameter of the aperture 48 is provided at the adjuster body 41.

The moving mechanism of the adjuster body 41 includes cam grooves (not shown) respectively provided at the pair of blade members 45, 46, and an arm (not shown) having two cam pins which are engaged with the cam grooves respectively. The arm is fixed to the drive shaft of the stepping motor 42.

As the drive shaft of the stepping motor 42 rotates, the arm rotates to cause the blade members 45, 46 to make linear movements in the opposite directions via the cam pins and cam grooves. When the blade members 45, 46 make linear movements in the opposite directions, the aperture 48 becomes either an open state or a totally closed state. That is, the state of the aperture 48 changes as the microprocessor 51 controls the driving of the stepping motor 42. In the open state, the aperture 48 has one of a plurality of predetermined diameters.

The moving mechanism is designed to move the blade members 45, 46 as the drive shaft of the stepping motor 42 rotates, and can take various structures known.

[Configuration of Control Section]

Next, the configuration of the control section 32 provided at the apparatus body 3 will be described referring to FIG. 1.

The control section 32 has the microprocessor 51, a signal processor 52, a first actuator driver 53, a second actuator driver 54, a stabilization-actuator driver 55, and a stepping-motor driver 56.

The microprocessor 51 serves the main function of the control section 32. The microprocessor 51 has a memory 58. The memory 58 includes an ROM (Read Only Memory) and RAM (Random Access Memory). A program which is executed by the microprocessor 51 and data or the like needed for the processing are stored in the ROM. The RAM is used to temporarily store data at the time the microprocessor 51 executes the program.

The microprocessor 51 is connected with the sensors 19, 26, 30, 49. The microprocessor 51 is further connected with the signal processor 52, the first actuator driver 53, the second actuator driver 54, the stabilization-actuator driver 55 and the stepping-motor driver 56.

The signal processor 52 is connected to the solid-state imaging device 31 mounted to the barrel case 12 via an amplifier (not shown). An electric signal output from the solid-state imaging device 31 is amplified by the amplifier, and is input to the signal processor 52. The signal processor 52 processes the supplied electric signal to generate an image signal, and outputs the image signal to the microprocessor 51.

The microprocessor 51 generates image data based on the image signal supplied from the signal processor 52, and outputs the image data to a monitor drive section (not shown). The microprocessor 51 records the generated image data into an information recording medium (not shown) or reads the image data recorded in the information recording medium.

The microprocessor 51 performs a predetermined computation process to generate a control signal for moving the second lens group 6 based on the position of the second lens group 6 detected by the sensor 19, the image signal supplied from the signal processor 52, etc. Then, the microprocessor 51 outputs the generated control signal to the first actuator driver 53. The first actuator driver 53 is connected to the motor 16 of the first actuator 15. The first actuator driver 53 drives the motor 16 to move the second lens group 6 in the direction of the optical axis L based on the supplied control signal.

The microprocessor 51 performs a predetermined computation process to generate a control signal for moving the fourth lens group 8 based on the position of the fourth lens group 8 detected by the sensor 26, the image signal supplied from the signal processor 52, etc. Then, the microprocessor 51 outputs the generated control signal to the second actuator driver 54. The second actuator driver 54 is connected to the motor 23 of the second actuator 22. The second actuator driver 54 drives the motor 23 to move the fourth lens group 8 in the direction of the optical axis L based on the supplied control signal.

The microprocessor 51 performs a predetermined computation process to generate a control signal for moving the sixth lens group 10 based on the position of the sixth lens group 10 detected by the sensor 30, vibration of the apparatus body 3 occurred, the image signal supplied from the signal processor 52, etc. Then, the microprocessor 51 outputs the generated control signal to the stabilization-actuator driver 55. Note that the vibration of the apparatus body 3 is detected by a vibration detection section (not shown), such as a gyro sensor or acceleration sensor.

The stabilization-actuator driver 55 is connected to the stabilization actuator 29 (e.g., coil). The stabilization-actuator driver 55 drives the stabilization actuator 29 to move the sixth lens group 10 in a direction orthogonal to the direction of the optical axis L based on the control signal supplied from the microprocessor 51.

The microprocessor 51 performs a predetermined computation process to generate a control signal for moving the pair of blade members 45, 46 based on the diameter of the aperture 48 detected by the sensor 49, a shutter operation instruction, the image signal supplied from the signal processor 52, etc. Then, the microprocessor 51 outputs the generated control signal to the stepping-motor driver 56.

The stepping-motor driver 56 is connected to the stepping motor 42. The stepping-motor driver 56 drives the stepping motor 42 to change the diameter of the aperture 48, formed by the pair of blade members 45, 46, based on the supplied control signal.

The rotational speeds of the stepping motor 42 in case of setting the aperture 48 to the totally closed state from the individual diameters of the aperture 48 and the maximum speeds corresponding to the individual diameters are stored in the memory 58 of the microprocessor 51 beforehand. Based on the rotational speed of the stepping motor 42 and the maximum speed corresponding to each diameter, the microprocessor 51 performs a predetermined computation process to generate a control signal for setting the aperture 48 to the totally closed state from the open state (performing the shutter operation).

In case where the rotational angle of the stepping motor 42 in the shutter operation fulfills the following conditional equation, the microprocessor 51 generates a control signal to increase the rotational speed of the stepping motor 42 during the shutter operation.

rotational angle of stepping motor 42≧(360/number of polarized poles)×number of coils The right-hand side of the conditional equation, (360/number of polarized poles)×number of coils, is equivalent to one period of the electric period of the stepping motor 42. That is, the microprocessor 51 generates a control signal to increase the rotational speed of the stepping motor 42 during the shutter operation when the electric period of the stepping motor 42 is equal to or greater than one period.

Changing the rotational speed of the stepping motor 42 is set to be carried out after the resistance acting on the stepping motor 42 changes from static friction to dynamical friction. When the shutter operation is executed based on such a control signal, the shutter operation can be completed faster than that in case where the shutter operation is executed in response to an instruction making the rotational speed of the stepping motor 42 constant. A time of changing the rotational speed corresponding to each diameter of the aperture 48 which permits the electric period of the stepping motor 42 to be equal to or greater than one period, and the rotational speed after the speed change are stored in the memory 58.

[Example of Measurement]

Next, the time for the aperture 48 to become the totally closed state with the rotational speed of the stepping motor 42 increased will be described below referring to FIGS. 3 and 4.

FIG. 3 is a table showing the results of measuring the time for the aperture 48 to become the totally closed state by changing the change-over time (timing) of increasing the rotational speed of the stepping motor 42. FIG. 4 is a diagram showing a change in light quantity when the aperture is set to the totally closed state in response to the instruction of making the rotational speed constant.

In this measurement, the time for the aperture 48 to become the totally closed state from a predetermined open state (shutter time) by changing the change-over time of increasing the rotational speed of the stepping motor 42 was measured. In the embodiment, a change-over time T is expressed by using T1 which is a time for the light quantity to reach 90% after the start of the shutter operation ((hereinafter called "reference time") in case of executing the shutter operation in response to the instruction of making the rotational speed constant. In other words, the change-over time T is given by $$T=\alpha T1.$$

Note that the reference time for representing the change-over time T is not limited to the reference time T1, and can be set arbitrarily. For example, the reference time for expressing the change-over time T may be set to a time T2 at which the light quantity reaches 80% after the start of the shutter operation. In this case, the change-over time T is given by $$T=\beta T2.$$

In the embodiment, T2=1.3T1.

In the embodiment, the rotational speed of the stepping motor 42 after the change-over time T (second rotational speed) is set about 1.3 times the rotational speed of the stepping motor 42 before the change-over time T (first rotational speed). The second rotational speed according to the embodiment of the invention can be set adequately in consideration of the local starting voltage of the stepping motor, the pressure angle of the cam groove, the frictional load on the blade member and so forth.

The time for the aperture 48 to become the totally closed state from the open state in response to the instruction of making the rotational speed constant is hereinafter called "related-art time until the totally closed state".

As shown in FIG. 3, the pair of blade members 45, 46 (shutter) did not move when α was 0.5 (T=0.5T1). This is because even if the rotational speed of the stepping motor 42 is increased with static friction present between the pair of blade members 45, 46 and the arm, the torque at that time is smaller than the resistance of static friction. Therefore, the change-over time T cannot be set within the time where static friction occurs.

When α is 0.6 (T=0.6T1) which is a point A in FIG. 4, on the other hand, it indicates the time at which the resistance acting on the stepping motor 42 is changed from static friction to dynamical friction. When T=0.6T1, therefore, the pair of blade members 45, 46 (shutter) operate. At this time, the time for the aperture 48 to become the totally closed state is 90.8% of the related-art time to reach the totally closed state. In other words, when T=0.6T1, the aperture 48 is totally closed faster than the related-art time to reach the totally closed state.

When α is 1.5 (T=1.5T1), for example, the time for the aperture 48 to become the totally closed state is 79.7% of the related-art time, or the shortest. At this time, the ratio of the change-over time T to the related-art time to reach the totally closed state becomes 25.6%. When the ratio of the change-over time T to the related-art time to reach the totally closed state is set to approximately 25%, therefore, it is possible to efficiently shorten the time for the aperture 48 to become the totally closed state.

When α is 3.0 (T=3.0T1), the time for the aperture 48 to become the totally closed state becomes 97.4%. That is, when T=3.0T1, the time for the aperture 48 to become the totally closed state becomes substantially equal to the related-art time to reach the totally closed state. It is therefore favorable to set the change-over time T equal to or less than 3.0T1 (T5≦3.0T1).

When T=3.0T1, the ratio of the change-over time T to the related-art time to reach the totally closed state becomes 51.1%. When the ratio of the change-over time T to the related-art time to reach the totally closed state is set to approximately 50% (about a half), therefore, it is possible to set the time for the aperture 48 to become the totally closed state shorter than the related-art time to reach the totally closed state.

[Change in Light Quantity According to the Embodiment]

A change in light quantity according to the embodiment will be described below referring to FIGS. 5A and 5B.

Figure 5A:
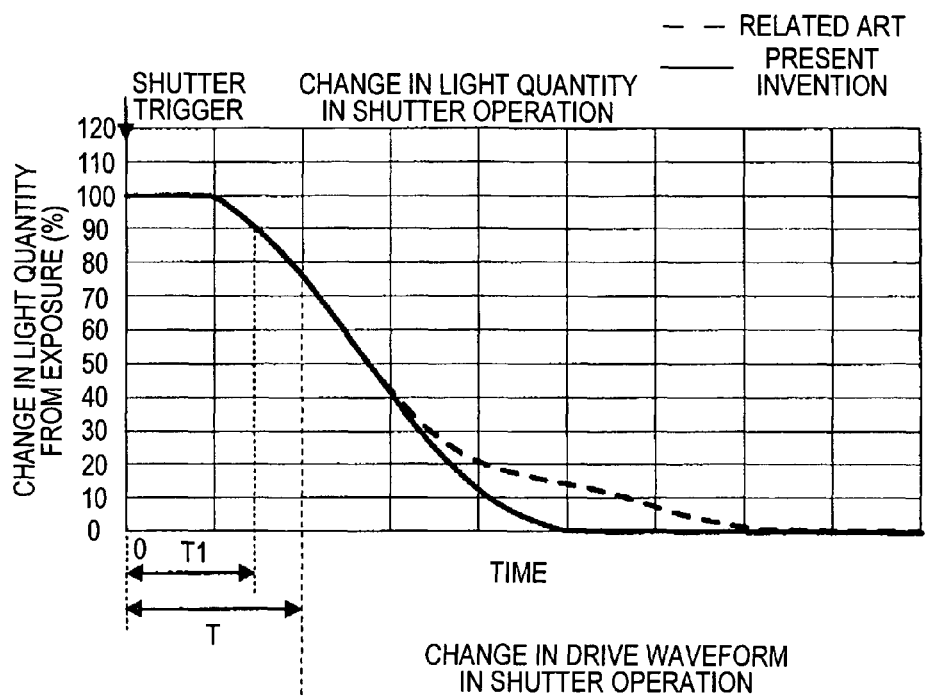
FIG. 5A is a diagram showing a change in light quantity in the shutter operation in the embodiment of the light quantity adjuster according to the invention and a change in light quantity in the shutter operation according to the related art.

FIG. 5A is a diagram showing a change in light quantity in the shutter operation according to the embodiment and a change in light quantity in the shutter operation according to the related art. FIG. 5B is a diagram showing a drive waveform corresponding to an instruction to change the rotational speed of the stepping motor 42 according to the embodiment and a drive waveform corresponding to a related-art instruction to set the rotational speed of the stepping motor 42 constant.

The change in light quantity according to the embodiment shown in FIG. 5A represents a change in light quantity when T=1.5T1. When the rotational speed of the stepping motor 42 is increased at the change-over time T, the light quantity does not become a wavy curve but changes smoothly. This can make the time needed to complete the shutter operation shorter than the time in the related art. That is, when the rotational speed of the stepping motor 42 is increased at the change-over time T, the shutter operation can be completed faster than that in the related art.

Figure 5B:
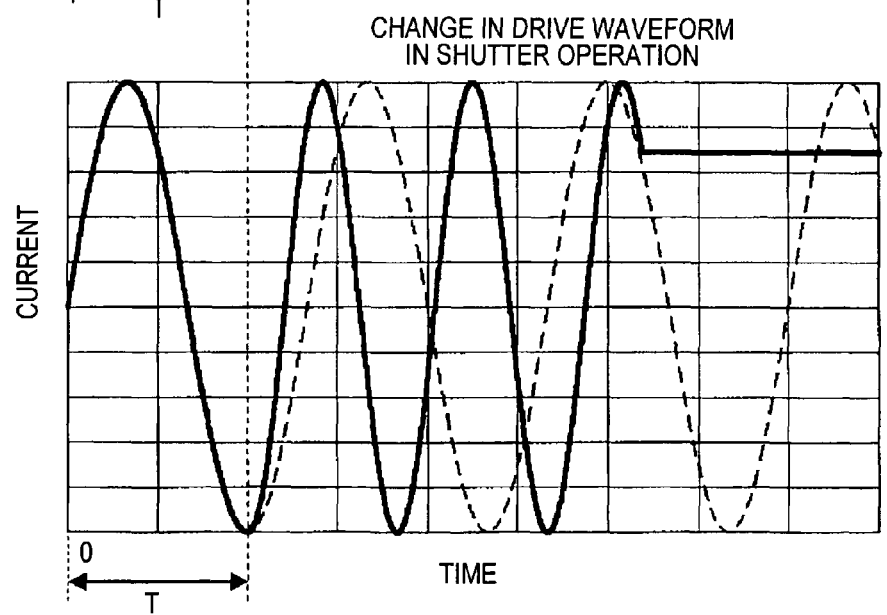
FIG. 5B is a diagram showing a drive waveform corresponding to an instruction to change the rotational speed of the stepping motor in the embodiment of the light quantity adjuster according to the invention and a drive waveform corresponding to an instruction of the related art.

Meanwhile, as shown in FIG. 5B, the period (electric period) of the drive waveform corresponding to the instruction according to the embodiment becomes shorter after the change-over time T. However, the rotational angle of the stepping motor 42 until the completion of the shutter operation does not change. Accordingly, the number of drive waveforms corresponding to the instruction according to the embodiment is the same as the number of drive waveforms corresponding to the related-art instruction.

When the shutter operation is completed in a shorter time than one period of the drive waveform corresponding to the instruction according to the embodiment, for example, the time for the shutter operation to become complete from the change-over time T becomes shorter than the case where the shutter operation is completed in a longer time than one period of the drive waveform. When the shutter operation is completed in a shorter time than one period of the drive waveform, therefore, it is difficult to make the shutter time shorter than the related-art shutter time even if the rotational speed of the stepping motor 42 is increased at the change-over time T.

It is therefore favorable to execute control to increase the rotational speed of the stepping motor 42 at the change-over time T in case where the shutter operation is completed in a longer time than one period (electric period) of the drive waveform.

[Still Picture Capturing Process]

Next, the still picture capturing process that is executed by the control section 32 of the imaging apparatus 1 will be described below referring to FIG. 6.

Figure 6:
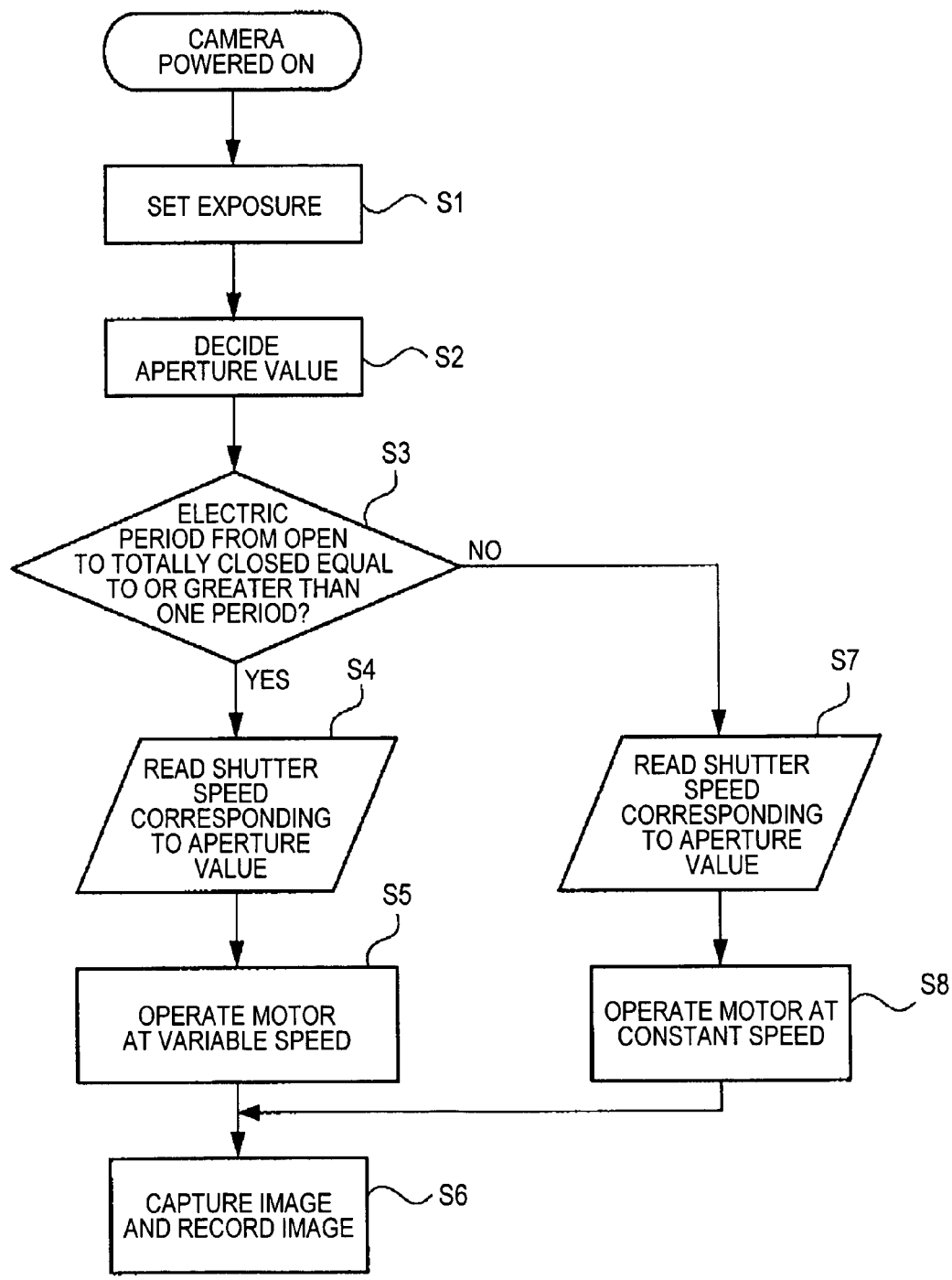
FIG. 6 is a flowchart illustrating an example of a still picture capturing process which is executed by a control section in the embodiment of the imaging apparatus according to the invention.
Figure 7:
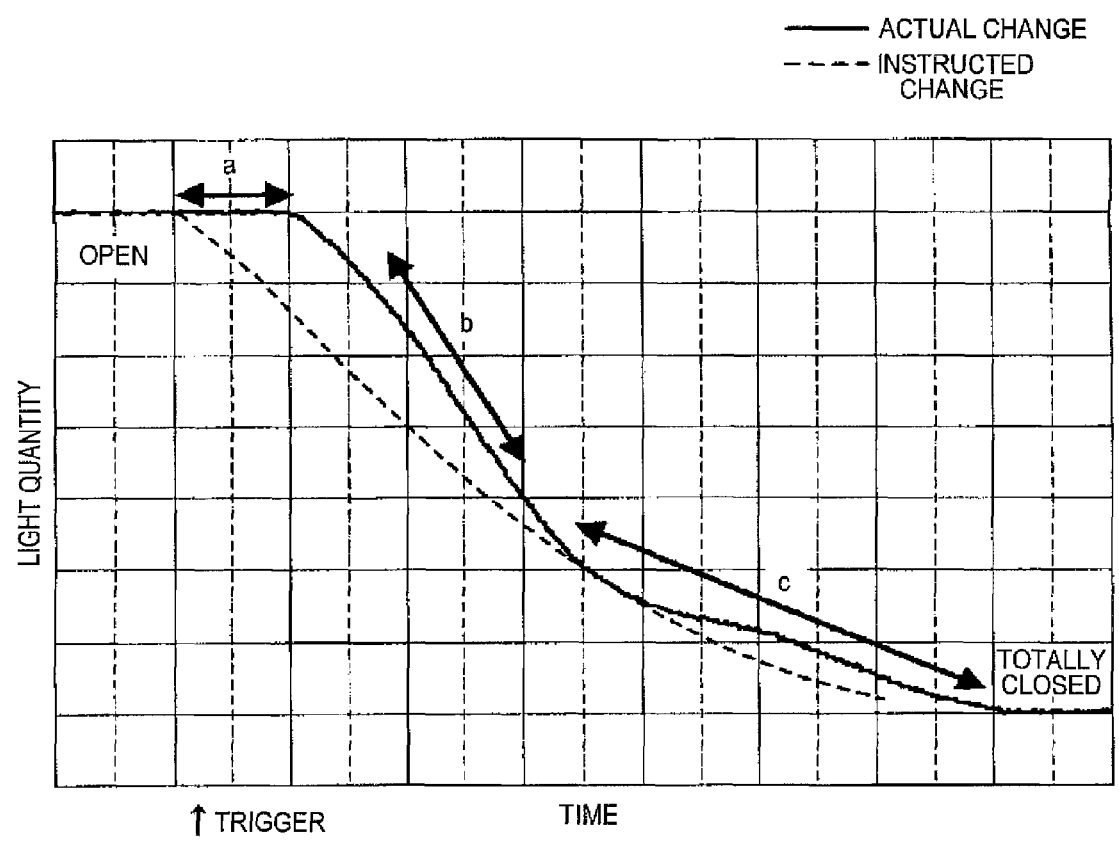
FIG. 7 is a diagram showing the relation between the actual change in light quantity when the stepping motor is driven always at a constant speed, and a change in light quantity instructed by a microprocessor.

FIG. 6 is a flowchart illustrating an example of the still picture capturing process which is executed by the control section 32.

When the imaging apparatus 1 is powered on, the microprocessor 51 performs exposure setting (step S1). In this process, an exposure value corresponding to the environment to be imaged. Next, the microprocessor 51 decides the aperture value based on the set exposure value (step S2). The aperture value indicates the diameter of the aperture 48. Therefore, the diameter of the aperture 48 is decided through the process of step S2.

Next, the microprocessor 51 discriminates whether the electric period of the stepping motor 42 is equal to or greater than one period until the aperture 48 with the decided diameter is set to the totally closed state time from the open state (step S3). When discriminating that the electric period of the stepping motor 42 is equal to or greater than one period until the aperture 48 is totally closed, the microprocessor 51 reads the shutter speed corresponding to the aperture value from the memory 58 (step S4).

When a shutter button (not shown) is manipulated thereafter, the microprocessor 51 operates the blade members 45, 46 while changing the drive speed of the stepping motor 42 (step S5).

Specifically, the microprocessor 51 generates a control signal (instruction) to increase the drive speed of the stepping motor 42 after the change-over time T passes from the start of the operation of closing the aperture 48 (shutter), and outputs the control signal to the stepping-motor driver 56. Then, based on the supplied control signal, the stepping-motor driver 56 drives the stepping motor 42 to move the pair of blade members 45, 46. This totally closes the aperture 48, which completes the shutter operation.

In the shutter operation, the stepping motor 42 is driven based on the instruction to increase the rotational speed of the stepping motor 42 after the change-over time T elapses. This can prevent or refrain the instruction from the microprocessor 51 from braking the driving of the stepping motor 42. As a result, the quantity of light passing the aperture 48 does not become a wavy curve but changes smoothly, so that the shutter time (speed) can be made faster than the one permitted in the shutter operation based on the instruction specifying a constant rotational speed.

When it is discriminated in the process of step S3 that the electric period of the stepping motor 42 is not equal to or greater than one period until the aperture 48 is totally closed, on the other hand, the microprocessor 51 reads the shutter speed corresponding to the aperture value from the memory 58 (step S7).

When the shutter button is manipulated thereafter, the microprocessor 51 operates the stepping motor 42 at a constant speed (step S8). Specifically, the microprocessor 51 generates a control signal (instruction) to operate the stepping motor 42 at a constant speed, and outputs the control signal to the stepping-motor driver 56. Then, based on the supplied control signal, the stepping-motor driver 56 drives the stepping motor 42 to move the pair of blade members 45, 46. This totally closes the aperture 48, which completes the shutter operation.

In the shutter operation, the rotational angle of the stepping motor 42 is smaller than a rotational angle corresponding to one period of the electric period of the stepping motor 42. In other words, the shutter operation is completed in a time shorter than one period of the electric period of the stepping motor 42. Accordingly, the shutter operation is completed before the instruction from the microprocessor 51 brakes the driving of the stepping motor 42.

After the process of step S5 or after the process of step S8, the microprocessor 51 captures an image, and records the image into the information recording medium (step S9). That is, the microprocessor 51 generates image data based on the image signal supplied from the signal processor 52, and records the image data into the information recording medium.

Advantage of The Embodiment

In case of closing the aperture 48, the light quantity adjuster and imaging apparatus according to the embodiment increase the rotational speed of the stepping motor 42 after the resistance acting on the stepping motor 42 is changed from static friction to dynamical friction. This can prevent or refrain the instruction from the microprocessor 51 from braking the driving of the stepping motor 42. This makes it possible to refrain the actual change in light quantity from transiently responding to the instructed change in light quantity.

As a result, the shutter time (speed) can be made faster than the one provided in the shutter operation based on the instruction specifying a constant rotational speed, so that the shutter operation suitable for capturing a still picture can be executed. In addition, it is unnecessary to shorten the electric period of the stepping motor 42 and exposure control matching with imaging of a moving picture is enabled.

When the electric period of the stepping motor 42 from the open state of the aperture 48 to the totally closed state thereof is equal to or greater than one period, the light quantity adjuster and imaging apparatus according to the embodiment increase the rotational speed of the stepping motor 42 during the operation thereof. This can surely make the shutter time (speed) faster than the one provided in the shutter operation based on the instruction specifying a constant rotational speed.

When the electric period of the stepping motor 42 from the open state of the aperture 48 to the totally closed state thereof is shorter than one period, on the other hand, the stepping motor 42 is driven based on the instruction specifying a constant rotational speed. That is, when an effect of shortening the shutter time cannot be expected even by increasing the rotational speed of the stepping motor 42 during the operation thereof, control to increase the rotational speed of the stepping motor 42 during the operation thereof is not executed. This can suppress power consumption of the light quantity adjuster and the imaging apparatus.

Modifications

The invention is not limited to the foregoing and illustrated embodiment, it should be apparent to those skilled in the art that the invention may be modified in various forms without departing from the spirit or scope of the invention. Although the foregoing description of the embodiment has been given of the light quantity adjuster having two blade members by way of example, for example, the light quantity adjuster according to the invention may have a single blade member or three or more blade members.

While the foregoing embodiment is configured to transmit the drive power of the stepping motor 42 to the two blade members via the arm, the moving mechanism according to the embodiment of the invention may be configured to transmit the drive power of the stepping motor 42 to the blade members via a gear.

The foregoing description of the embodiment has been given of the imaging apparatus capable of recording captured images into an information recording medium by way of example. However, the light quantity adjuster according to the embodiment of the invention may be configured to have a hard disk drive where captured images are recorded.

Although the foregoing embodiment is configured to preset the change-over time T and store the change-over time T in the memory 58, the change-over time T may not be preset in the light quantity adjuster and the imaging apparatus according to the embodiment of the invention. For example, a sensor to detect the torque acting on the drive shaft of the stepping motor 42 may be provided, so that the change-over time T is decided based on the value of the torque detected by the sensor.

Although the foregoing embodiment is configured so that the control section 32 of the imaging apparatus 1 serves as the control section of the light quantity adjuster 4, the control section of the light quantity adjuster 4 may be provided as separate from the control section 32 of the imaging apparatus 1. In this case, the control section of the light quantity adjuster 4 can be provided in the adjuster body 41.

It should be understood by those skilled in the art that various modifications, combinations, sub-combinations and alterations may occur depending on design requirements and other factors insofar as they are within the scope of the appended claims or the equivalents thereof.

What is claimed is:

1. A light quantity adjuster comprising:
a blade member forming an aperture;
a stepping motor that moves the blade member to open/close the aperture; and
a control section that controls driving of the stepping motor,
said control section determines whether an electric period of the stepping motor is equal to or greater than an aperture period in which the aperture period is from an open state of the aperture to a totally closed state of the aperture, when a determination result thereof indicates that the electric period is not equal to or greater than the aperture period said control section causes the stepping motor to rotate at a constant rotational speed, and when the determination result indicates that the electric period is equal to or greater than the aperture period said control section causes the stepping motor to rotate at a variable rotational speed which includes a rotational speed which is larger than the constant rotational speed.

2. The light quantity adjuster according to claim 1, wherein a change-over time to increase the rotational speed of the stepping motor is set shorter than about a half of a time for the aperture to become the totally closed state after the stepping motor receives an instruction to start driving the stepping motor.

3. The light quantity adjuster according to claim 2, wherein a change-over time to increase the rotational speed of the stepping motor is set to about a quarter of a time for the aperture to become the totally closed state after the stepping motor receives the instruction to start driving the stepping motor.

4. The light quantity adjuster according to claim 3, wherein a change-over time to increase the rotational speed of the stepping motor is expressed based on a time when a light quantity with the rotational speed of the stepping motor being constant becomes a predetermined value.

5. An imaging apparatus comprising:
a lens barrel provided with a lens and a light quantity adjuster which adjusts a quantity of light input via the lens; and
an apparatus body that supports the lens barrel, the light quantity adjuster including
a blade member forming an aperture, a stepping motor that moves the blade member to open/close the aperture, and
a control section that controls driving of the stepping motor,
said control section determines whether an electric period of the stepping motor is equal to or greater than an aperture period in which the aperture period is from an open state of the aperture to a totally closed state of the aperture, when a determination result thereof indicates that the electric period is not equal to or greater than the aperture period said control section causes the stepping motor to rotate at a constant rotational speed, and when the determination result indicates that the electric period is equal to or greater than the aperture period said control section causes the stepping motor to rotate at a variable rotational speed which includes a rotational speed which is larger than the constant rotational speed.

* * * * *